Patented Apr. 2, 1929.

1,707,466

UNITED STATES PATENT OFFICE.

WILLIAM HUNTER VOLCK, OF WATSONVILLE, CALIFORNIA, ASSIGNOR TO CALIFORNIA SPRAY CHEMICAL COMPANY, OF WATSONVILLE, CALIFORNIA, A CORPORATION OF CALIFORNIA.

INSECTICIDE AND METHOD OF MAKING THE SAME.

No Drawing. Application filed September 17, 1925. Serial No. 57,018.

In my copending application Serial No. 720,508 I have described a novel class of oils with respect to their phytocidal qualities (i. e. phytonomic oils) and a new kind of insecticide made therefrom. One desirable form of this insecticide consists of a phytonomic oil, water and an amulsifying agent so combined as to produce a thick heavy substance which on mixing with, or dilution with water makes an excellent spray solution or emulsion or dispersion of the oil in water which is highly insecticidal but perfectly harmless to plant life.

More specifically I have discovered that, contrary to common belief, the substantially non-volatile viscous oils, when properly purified and substantially free from phytocidal ingredients, are phytonomic oils. By "viscous" I mean having sufficient resistance to flow to permit their forming films on the foliage, etc., and by "substantially non-volatile" I mean non-volatile enough to maintain this film when formed over or within the insect of sufficient thickness to be effective and to produce fatal results. "Substantially free from phytocidal ingredients" of course means that the concentration of the impurities in the oil shall be so small that it will be safe to expose the plant thereto, during the natural period of slow evaporation and absorption of the film.

I have now discovered that the insecticidal effectiveness and practical economy of such emulsions is proportional in part to the speed and completeness with which the emulsion reverts or breaks into films of oil and water and becomes directly effective on contact with the stems, the foliage and fruit, thereby depositing the oil more completely and evenly where it will be most useful. This phenomena I have never observed with the old type of oil sprays and believe the reason to be that, unless the oils used are sufficiently pure, certain of their own impurities affect the stability of the emulsion so erratically that variable rates of break-down could not be clearly observed and could, therefore, not be adjusted or controlled.

It is necessary to insure the stability of oil emulsions during manufacture and desirable storage, packaging, transit, further storage, dilution and application. To do so, it has hitherto been the custom to make them as stable as possible by the free and unrestricted use of emulsifying or stabilizing agents or both. Consequently the previous oil emulsions have been relatively stable and ineffective for insecticidal purposes such as the spraying of plants or the like or other surfaces quite apart from the phytocidal or phytonomic action of the oil itself.

In the light of my discovery I have devised a new product, i. e. an insecticidal emulsion which substantially breaks down, or as I believe separates or reverts, preferably with substantial completeness, or at least largely does so, when or as soon as it comes in contact with the foliage or fruit or other parts of the plant, or certain other surfaces to which it is applied, and have devised a new process of making the same. In using this emulsion the oil adheres to the plant or insect or eggs and does not largely drain away with the excess water used to distribute and apply it. This I believe occurs in consequence of the reversion of the emulsion, producing oil films on the surface of the water or the solid body or both, at least to a degree sufficient to cause the oil film to spread upon the plant or other surface, and to attract other oil particles to itself and permit the water to shed away deprived in large measure of its oil, while the oil remains upon the plant largely separated from the water. Whatever the cause, I am able to produce by my process oil emulsions which are substantially twice as effective and economic in the amount required to insure a "complete kill" as any hitherto known to me. Furthermore they are correspondingly more reliable in their distribution over the plant surface and more permanent in their adhesion thereto. Thus I am able to produce a phytonomic oil emulsion characterized by one or more of the following; it can be prepared with more than 75% of oil content; when completed it is substantially stable as such to ordinary handling, will stand dilution with water without separation, in the ratio of 20 or more to 1; when diluted it remains substantially stable during ordinary agitation and spraying; 1½% of oil therein is almost completely fatal to insect scale and insect eggs wherever the emulsion is applied; it has what I call the property of substantially immediate reversion, that is, the oil separates promptly on contact with the plant or other suitable surface to which it is applied and is not readily removed by its accompanying water or by rain or by dew; and the fact that most ordinary insect pests can consequently be controlled with a single seasonal application of this insecticide alone.

The process of manufacture is characterized by the fact that an emulsifying agent is selected and proportioned to this end and I prefer to use an emulsifying agent having several separative, emulsifying or lubricating constituents of different or varying effectiveness instead of just one emulsifying agent as has hitherto been the practice; also my process is preferably carried out in a progressive manner of producing the action between the various constituents, and by the adjustment of the proportion of the emulsifying and other agents or constituents to such quantities (determinable by simple tests) that the emulsion when formed shall be sufficiently stabilized to be practically permanent on standing, etc. and dilution, yet shall promptly break down (at least in part) on contact with the plant or other surface and promote the separation of the remainder of the oil. The process is preferably also characterized by a suitable adjustment of the oil to water proportion as compared with the duration of the emulsifying treatment for any given apparatus by proper temperature control and by suitable adjustment of the pressure or intensity of the emulsifying action in whatever form of apparatus may be used. Some or all of these characteristics of the process will be needed to produce my novel product.

By way of example that shall enable any one skilled in the art of preparing various oil-water emulsions to carry out my process and obtain my product, I will give a specific example of the process and indicate the effect of varying certain of the conditions, but intend not to be limited thereby in the scope of the process or product as claimed or to any particular part thereof.

The emulsifying agent for a 4,000 gallon batch of concentrated oil emulsion containing 83 percent by volume of actual oil is prepared as follows:

| | |
|---|---|
| Casein in the form of potassium caseinate | 24 pounds. |
| Rosin in the form of potassium resinate | 3 pounds. |
| Fatty acid (such as oleic acid) in the form of potassium oleate | 2 pounds. |
| Ammonia (saturated aqueous solution) | 15 gals. |
| To which is added distilled water to make a total volume of | 80 gals. |

The emulsifier as above described is placed in a 4,500 gallon cylindrical tank provided with suitable agitators of any well known type and connected at the bottom with the intake side of a mixing pump of about 120 gals. per minute capacity supplied with necessary power to operate at about 200 lbs. delivery pressure.

The emulsifier is passed through the pump and returned to the top of the tank above the surface of its contents through nozzles or vents regulated to give a pressure of about 200 pounds to the square inch.

As a suitable oil to make, for example, an insecticidal spray such as that being marketed under the name "Volck concentrate", I prefer to use crystal oil derived from lubricating stock from which all unsaturated hydrocarbons have been removed. This oil is now gradually introduced through the suction end of the pump by means of a separate line and small supply pump.

The passage of the oil through the pump and nozzles together with the solution of the emulsifying agent causes the oil to be broken up into an emulsion. The process of pumping and agitation continues until 3320 gallons of oil have been introduced into the emulsifying tank preferably through the pump. While the emulsion is building up in the tank, the mechanical agitator is constantly in motion to insure uniform mixture of the mass.

The introduction of oil into the emulsifying pump should be regulated carefully. At first the oil may constitute as much as one-half the total volume of the mixture passing through the pump. As the emulsion builds up, however, the oil should be gradually reduced until, toward the finish of the batch, it may be as little as one-tenth the total volume passing through the pump.

In order to avoid the delay caused by slow introduction of oil through the pump towards the finish of the batch it may, in some cases, be pumped directly into the tanks and stirred into a creamy mass by the mechanical agitator. This direct addition of oil when permissible is usually started when the batch is about three-fourths complete. Of course it is necessary to continue pumping until the oil which is merely stirred into the mass has been passed through the pump one or more times and become properly emulsified.

The emulsification process may be controlled by an attendant who is continually watching a test basin into which a one-eighth inch pipe from the emulsifying pump is discharging.

The emulsion which is normally a more or less thick creamy mass will break to a thinner oil-like liquid when the emulsion is inverted by the too rapid introduction of oil. This change quickly shows in the test basin and the attendant reduces the oil stream until the difficulty is corrected.

The preferred consistency of the emulsion is that of a cream which is just flowable by ordinary gravity but which readily pumps to the package filler. If the emulsion is too thin there is likely to be a stratification in the package after long standing.

In this formula I belived casein is the stabilizer. The resinates and oleate cooperate with the casein and I believe act as a sort of lubricator to prevent undue thickening of the emulsion while the ammonia cooperates to suitably adjust the alkalinity and I believe acts also as a preservative and to prevent bacterial decomposition of the casein and rusting of the metal drums in which the emulsion is usually packed.

The consistency of the emulsion may be regulated by the composition of the emulsifier as well as by the method of emulsification and proportions of oil and water. The temperature of the emulsifier is also important, the better results are generally obtained when the ingredients are mixed at ordinary temperature, and not warm or hot.

The ideal emulsion should remain of uniform consistency in the packages, neither stratifying nor curdling nor undergoing other forms of decomposition, and when diluted say 30 or even 40 to 1 with water should remain uniformly suspended in the diluting water with moderate agitation and yet deposit oil almost instantly when the spray comes in contact with a solid surface such as the plant or the bodies or eggs of insects.

In practice hewever I am able to prepare mixtures which are in effect emulsions because the proper adjustment of emulsifying agents enables one to roughly disperse the oil in such a manner that on spraying the practical effect of quick breaking emulsion is obtained. For brevity I describe both these rough dispersions and the ideal dispersions as emulsions.

Such a concentrated emulsion carries a high percentage of oil thereby avoiding excessive cost of packages and freight to its ultimate destination. The preparation of an emulsion having the above described properties has hitherto been unknown.

From the above it will be obvious that certain conditions of mixing as well as of some of the minor ingredients may all be more or less considerably modified, or omitted altogether, and even the proportions of the chief ingredients may be considerably modified to suit the requirements and meet commercial conditions without departing wholly from the characteristic technical effects secured by my invention.

I claim:—

1. As a new article of manufacture, a parasiticidal emulsion consisting of a substantially non-volatile viscous oil substantially free from phytocidal ingredients, water and an emulsifying agent, which reverts substantially at once on contact with a solid surface.

2. A parasiticidal emulsion consisting of oil, water and a composite emulsifying agent having components of varying effectiveness, which reverts substantially at once on contact.

3. As a new article of manufacture, a parasiticidal emulsion consisting of oil, water and a composite emulsifying agent having components of varying effectiveness, which is stable during agitation and spraying and which substantially reverts on contact with the surface to which it is to be applied.

4. A parasiticidal emulsion of oil and water characterized by stability in ordinary handling before dilution, but which after dilution separates promptly on spraying into contact with a solid surface.

5. The process of making a parasiticidal emulsion of oil in water, which consists in mixing the oil, water and a predetermined amount of emulsifying agent, said emulsifying agent being in such relatively small quantity in proportion to the oil and water that the oil remains substantially emulsified during agitation and spraying but acquires the property of substantially reverting on contact with the surface to which it is to be applied.

6. The process of making a parasiticidal emulsion of oil and water, which consists in mixing the oil, water and a predetermined amount of emulsifying agent, the amount of said emulsifying agent being determined by the properties of the resulting emulsion of remaining substantially emulsified during agitation and spraying and of substantially reverting on contact with the surface to which it is to be applied.

7. A new article of manufacture, a parasiticide consisting of a quick-breaking emulsion composed of a viscous substantially non-volatile oil substantially free from phytocidal ingredients, water and an emulsifying agent adjusted in amount and composition of emulsifying components until when sprayed the run-off liquid contains a lower percentage of oil than the original emulsion.

8. The process of making a parasiticidal emulsion of oil and water which consists in mixing the oil and water and predetermined kinds and amounts of emulsifying agents, the amount of each of said emulsifying agents being determined as the amount of one agent which, cooperatively acting with the predetermined amount of other emulsifying substance, enables the emulsion to remain substantially permanent during agitation and spraying but enables it to substantially revert to separate films of oil and water on contact with the surface to which it is applied.

9. A new article of manufacture consisting of a quick-breaking parasiticidal emulsion composed of a viscous substantially non-volatile oil, water and an emulsifying agent further characterized by the fact that when sprayed on plants the run-off liquid contains a substantially lower percentage of oil than the original emulsion.

WILLIAM HUNTER VOLCK.

CERTIFICATE OF CORRECTION.

Patent No. 1,707,466.             Granted April 2, 1929, to

WILLIAM HUNTER VOLCK.

It is hereby certified that error appears in the printed specification of the above numbered patent requiring correction as follows: Page 2, line 52, "total volume of -- 80 gals." should read "total volume of -- 680 gals."; and that the said Letters Patent should be read with this correction therein that the same may conform to the record of the case in the Patent Office.

Signed and sealed this 7th day of May, A. D. 1929.

(Seal)                                           M. J. Moore,
                                                  Acting Commissioner of Patents.